(12) United States Patent
Ros (10) Patent No.: US 11,684,209 B2
(45) Date of Patent: Jun. 27, 2023

(54) MEAT GRILL INSTALLATION

(71) Applicant: 3D Food Machinery B.V., Berkel en Rodenrijs (NL)

(72) Inventor: Michael Ros, Berkel en Rodenrijs (NL)

(73) Assignee: 3D FOOD MACHINERY B.V., Berkel en Rodenrijs (NL)

( * ) Notice: Subject to any disclaimer, the term of this patent is extended or adjusted under 35 U.S.C. 154(b) by 401 days.

(21) Appl. No.: 16/913,974

(22) Filed: Jun. 26, 2020

(65) Prior Publication Data

US 2020/0405097 A1     Dec. 31, 2020

(30) Foreign Application Priority Data

Jun. 26, 2019 (NL) .................................... 2023386

(51) Int. Cl.
*A47J 37/04* (2006.01)
*A22C 17/00* (2006.01)

(52) U.S. Cl.
CPC ......... *A47J 37/044* (2013.01); *A22C 17/0033* (2013.01); *A47J 37/045* (2013.01)

(58) Field of Classification Search
CPC .... A47J 37/0455; A47J 37/045; A22C 1/0033
See application file for complete search history.

(56) References Cited

U.S. PATENT DOCUMENTS

| | | | |
|---|---|---|---|
| 4,050,370 A * | 9/1977 | Schmidt | A22C 17/0033 99/594 |
| 2017/0095112 A1 * | 4/2017 | Baker | A47J 37/044 |
| 2019/0059644 A1 * | 2/2019 | Nelson | A47J 36/32 |
| 2019/0191926 A1 * | 6/2019 | Guerrero | A47J 37/044 |
| 2019/0320846 A1 * | 10/2019 | Nevarez | A47J 37/044 |
| 2019/0387921 A1 * | 12/2019 | Lemberger | A47J 37/045 |
| 2021/0330120 A1 * | 10/2021 | Monroe | A47J 39/006 |

FOREIGN PATENT DOCUMENTS

| | | | |
|---|---|---|---|
| EP | 0777992 | 6/1997 | |
| EP | 2412283 | 2/2012 | |
| WO | WO-2004073471 A1 * | 9/2004 | ............ A47J 37/044 |
| WO | 2019/017780 | 1/2019 | |

* cited by examiner

*Primary Examiner* — Omar Flores Sanchez
(74) *Attorney, Agent, or Firm* — Peacock Law P.C.; Justin Muehlmeyer (57) ABSTRACT

A meat grill installation for preparing large quantities of meat, and a method of preparing such large quantities of meat. Embodiments of the meat installation comprise various features, including a detachable horizontal cylindrical carrier comprising a series of meat fixators, a motor, heaters, at least two position adapters for maintaining each individual heater at a predetermined distance from the cylindrical carrier, at least one temperature sensor, a conveyer belt located underneath the cylindrical carrier for receiving and transporting heated meat, a cutter for removing a slice of a predetermined thickness of meat from the detachable cylindrical carrier, and at least one controller for driving the motor, for maintaining and/or adapting a temperature of each individual heater, for driving the at least two position adapters, for receiving the sensor output, for providing feedback to at least one heater, and for controlling thickness of slices of meat.

15 Claims, 8 Drawing Sheets

MEAT GRILL INSTALLATION

CROSS-REFERENCE TO RELATED APPLICATIONS

This application claims priority to Netherlands Patent Application No. 2023386, entitled "Meat Grill Installation", filed on Jun. 26, 2019, and the specification and claims thereof are incorporated herein by reference.

FIELD OF THE INVENTION

The present invention is in the field of a meat grill installation for preparing large quantities of meat, and a method of preparing such large quantities of meat. Typically, meat may be prepared by heating in an oven, in a stove or in a pan, to a temperature sufficient to cook the meat. Meat may be fully cooked or partly cooked.

BACKGROUND OF THE INVENTION

Meat comprises water, protein, and fat. It may be eaten raw, but normally it is cooked and often seasoned as well. Unprocessed meat may have health risks due to infection with and decomposition by bacteria and fungi. It is therefore best cooled, or frozen, and thereafter processed quickly.

For various food items, such as pizza's, meat is used in thin slices. Preparation of large quantities of these thin slices is typically required, but still has to be done at least partly by hand. The capacity, per hour, is therefore typically limited.

Embodiments of the present invention relate to a meat grill installation and a method for heating frozen meat, which solves one or more of the above problems and drawbacks of the prior art, providing reliable results, without jeopardizing functionality and advantages.

BRIEF SUMMARY OF THE INVENTION

Embodiments of the present invention relate to a meat grill installation comprising a detachable horizontal cylindrical carrier for carrying meat (also referred to herein as a "cylindrical element"), typically a large quantity of meat. The cylindrical element comprises a series of meat fixators at its boundary. It further comprises a motor for rotating the cylindrical element around its horizontal axis. The horizontal axis may be slightly tilted. Further motors may be present, or combined, such as for driving a conveyor belt, for driving adaptable supports, for rotating a cutter, hereinafter named a cutting element, for driving position adapters, etc. It further comprises at least two heaters 30 for grilling the meat, typically 2-5 heaters at either side of the cylindrical element, such as 3-4 heaters, wherein the at least two heaters are divided over a circumference of the cylindrical element, typically not evenly divided in view of other parts being present, such as a conveyor belt. Heaters are typically provided at a substantially equal distance from the centre of the cylindrical element and are typically rotated, that is to say tilted, such that a heating part thereof faces the to be heated meat as much as possible. A length of each heater is individually adapted to a length of the cylindrical element, typically being more or less (±5%) the same length. Therewith the heaters are adapted to heat the meat evenly and as thorough as required. It further comprises at least two position adapters for maintaining each individual heater at a predetermined distance from the cylindrical element. Therewith the speed of heating is controlled. When meat is cut away the radius of the cylindrical element comprising meat becomes smaller and smaller, causing the heaters to be further and further away from the meat. Therefore, position adapters are provided to maintain the heaters at a substantially similar distance from the meat over time. Further at least one sensor is provided, preferably at least two sensors, for determining a temperature of the heated meat. The sensed temperature can be used to increase or decrease the distance of the heaters with respect to the meat, to increase or decrease the temperature of the heaters, to increase or decrease a rotation velocity of the cylindrical element, or maintain these variables, or a combination thereof. Further a conveyer belt is provided located underneath the cylindrical element for receiving and transporting heated meat. The conveyor belt typically moves in operation in a direction parallel to the longitudinal axis of the cylindrical element. For cutting meat a cutting element is provided for removing a slice of a predetermined thickness of meat from the detachable cylindrical element, which typically moves in operation in the same or opposite direction as the conveyor belt. The thickness may be varied by tilting the cutting element and/or adjusting the vertical position thereof. The width may be varied by providing a wider or smaller cutting element, and the length may be varied by increasing or decreasing a speed of the cutting element and a length of a path traveled by the cutting element, or a combination thereof. Also at least one controller is provided for driving the motor, for maintaining and/or adapting a temperature of each individual heater, for driving the at least two position adapters, for receiving the sensor output, for providing feedback to at least one heater, and for controlling thickness of slices of meat, and combinations thereof. The installation may be provided on a frame, and further security measures may be present, such as a fencing. For operation controls are typically provided, such as start and stop buttons. In addition, software may be provided for controlling the installation, typically loaded on a storage medium and provided as a processor. Therewith large quantities of meat can be processed in a well-controlled manner in a relatively short time.

In a second aspect the present invention relates to a method of heating 100-3000 kg of frozen meat, comprising providing a cylindrical element provided with meat, and the at least one diaphragm opened, moving the cylindrical element into the meat grill installation of the present invention, heating the meat, and cutting at least one slice of meat.

Thereby the present invention provides a solution to one or more of the above-mentioned problems and drawbacks.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention relate in a first aspect to an installation according to claim 1.

In an exemplary embodiment of the meat grill installation according to the present invention, the meat grill installation further comprises at least three in height adaptable supports, wherein the height of the supports is controlled by the at least one controller, and wherein the conveyor belt, at least one sensor, and cutting element are attached to the at least three supports.

In another embodiment, the meat grill installation further comprises at least one water supply, preferably at least one water supply at each side, for adapting a water content of the meat, and/or comprising at least one steam supply 56, preferably at least one steam supply at each side, for adapting a temperature of the meat. These supplies are typically directed towards the to be processed meat, i.e. in a direction parallel to a radius of the cylindrical element.

In another embodiment, the cylindrical element comprises two diaphragms, one at either side thereof, for enclosing meat, which diaphragms are adapted to at least partly open and close. Such as under the influence of escaping gasses, such as steam, during the heating of the meat.

In another embodiment, the cylindrical element is adapted to be maintained at a fixed height.

In another embodiment, the supports are mutually connected by a connector, such as a chain.

In another embodiment, the at least one controller drives the connector and thereby the height of the supports.

In another embodiment, the supports comprise a worm gear, and a gear adapted to be driven by the connector.

In another embodiment, the conveyor belt is an endless conveyor belt.

In another embodiment, the horizontal speed of the cutting element and conveyor belt may be adapted to one and another.

In another embodiment, the cutting element is adapted to be driven back and forth.

In another embodiment, the meat grill installation further comprises a shuttle in connection with the cutting element, wherein the shuttle is adapted for forward movement and backward movement, wherein during forward movement the shuttle tilts and fixes the cutting element in a forward angle of 5-35 degrees, such as 10-30 degrees, e.g. 20-25 degrees, with respect to the horizontal plane, and wherein during backward movement the shuttle tilts and fixes the cutting element in a backward angle of minus 5-35 degrees, such as 10-30 degrees, e.g. 20-25 degrees, with respect to the horizontal plane, wherein tilting is preferably provided by at least one tilt activator 66, such as a notch.

In another embodiment, the cutting element is a rotating disc provided with a sharp edge. The rotating disc may have a diameter of 10-300 mm, such as 20-150 mm, and may rotate with a speed of 100-6000 rpm, preferably 200-1000 rpm, such as 300-600 rpm.

In another embodiment, the meat grill installation further comprises a hydrocarbon gas supply, and wherein the at least one heater is a gas heater, such as ceramic gas heater. The hydrocarbon gas may be methane.

In another embodiment, the sensor may be an Infrared sensor.

In another embodiment, the cylindrical element may comprise an alarm, such as an audio and/or visual alarm. Optionally, in combination with an infrared sensor the alarm is triggered when, is use, a meat temperature is detected below a minimum desired cooking temperature and/or when, in use, a meat temperature is detected above a maximum desired cooking temperature.

In another embodiment, the series of meat fixators may comprise 2-30 spikes, such as 5-20 spikes.

In another embodiment, the cylindrical element may comprise at least two uptake elements 13 per meat fixator, such as 3-6 uptake elements, such as trapezium shaped uptake elements provided with an opening therein. As such the uptake elements, and spikes are well fixed and can carry the weight of the meat.

In another embodiment, the cylindrical element may comprise at least four recesses 14 provided along a longitudinal axis of the cylindrical element, such as 2-30 recesses, preferably wherein recesses have a trapezium shaped cross-section. The trapezium shape is found to improve fixation of uptake elements and spikes.

In an exemplary embodiment of the method according to an embodiment of the present invention, the slice of meat may have a length of 1-150 cm, preferably 20-100 cm, such as 30-80 cm, a thickness of 1-5 mm, such as 2-4 mm, and a width of 10-100 mm, such as 20-50 mm.

In another embodiment, the meat may be heated to a temperature of 100-170° C., such as 120-150° C. Said temperature refers to an outer layer of the meat (of a thickness to be cut typically) and may be measured with the present sensor. Too high temperatures are found to burn the meat and/or to dry the meat too much, whereas too low temperatures result in not fully prepared meat. The temperature and the rotating speed of the present cylindrical element may be adjusted and adapted to one and another, such as by the present controller and/or feedback loop.

In another embodiment, the heaters may provide infrared radiation at a wavelength of 1-5 μm, preferably 2-4 μm. This radiation is found particularly suited, and may be provided by the ceramic elements in the heaters.

In another embodiment, the heaters may provide infrared radiation at an intensity of 100-1000 W/m$^2$, preferably 200-800 W/m$^2$, more preferably 300-600 W/m$^2$, such as preferably 400-500 W/m$^2$.

In another embodiment, the heaters may operate at a temperature of 700-1000° C., preferably 800-900° C.

In another embodiment, the infrared gas burner wavelength is 2-4 microns. The gas fired infrared radiant burners may be unidirectional. A temperature of 900° C. can be achieved, and radiant energy is emitted. This wave band is found to be ideal for application to cooking equipment because it provides suitable radiation penetration into protein comprising meat to convert the radiated energy to heat. With infrared radiation, penetration of the electromagnetic radiation below the surface of the meat to be cooked is found to be limited to the outer 2 mm. As such an intense skin heating is provided. It is found that heat generated and absorbed at the surface of the meat is small, as a result of placing the meat at a distance from the heat source. Slight heat increases at the meat's surface will help to shorten the cooking time. The surface of the meat is best heated not too much as than only a slow rate of moisture content loss is observed. The rate of flavor and color development will also be slow. Evaporation of water may be compensated for, by providing water and/or steam.

In another embodiment, the cylindrical element may rotate with a speed of 1-10 degrees/sec, preferably 1-3 degrees/sec. At this rate good cooking properties and sufficient yield are obtained.

In another embodiment, the conveyor belt may run with a speed of 0.5-2 m/sec, such as 1-1.5 m/sec.

In another embodiment, the meat may be heated at a rate of 1000 kg/4-12 h, such as 500 kg/4-12 h.

In another embodiment, the meat may be selected from chicken, pork, lamb, beef, fish, plant protein, microbial protein, cell protein, insect protein, and combinations thereof. It is noted that strictly speaking plant protein and some of the further sources of protein mentioned are not meat, but the installation works equally well for those other forms of protein, mutatis mutandis.

In another embodiment, the meat may be cooked, grilled, or a combination thereof.

The one or more of the above examples and embodiments may be combined, falling within the scope of the invention.

The below relates to examples, which are not limiting in nature.

The invention is further detailed by the accompanying figures, which are exemplary and explanatory of nature and are not limiting the scope of the invention. To the person skilled in the art it may be clear that many variants, being obvious or not, may be conceivable falling within the scope of protection, defined by the present claims.

DETAILED DESCRIPTION OF THE FIGURES

Figure 1:
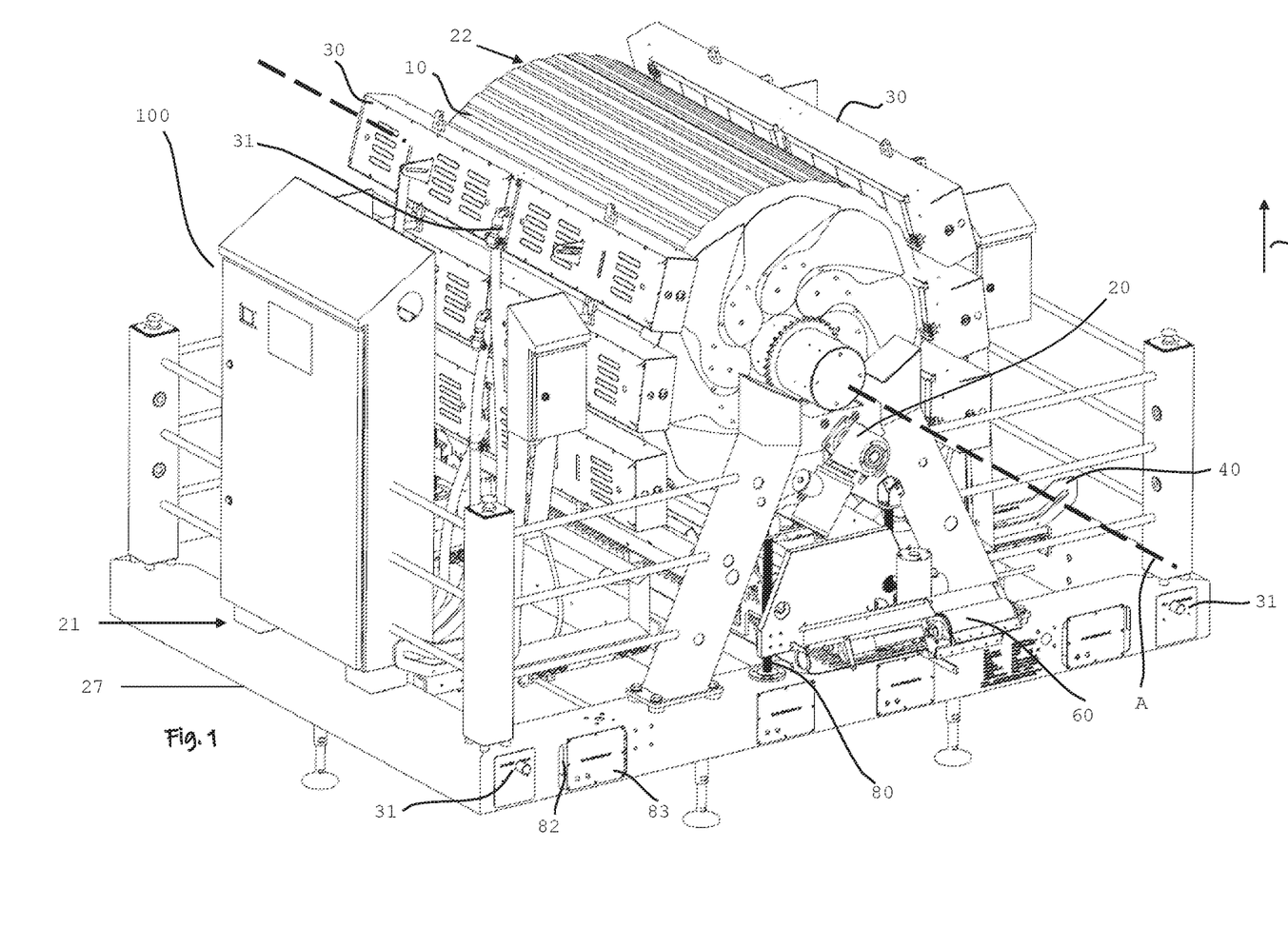
FIG. 1 is an illustration from a perspective view of a meat grill installation according to an embodiment of the present invention.
Figure 2:
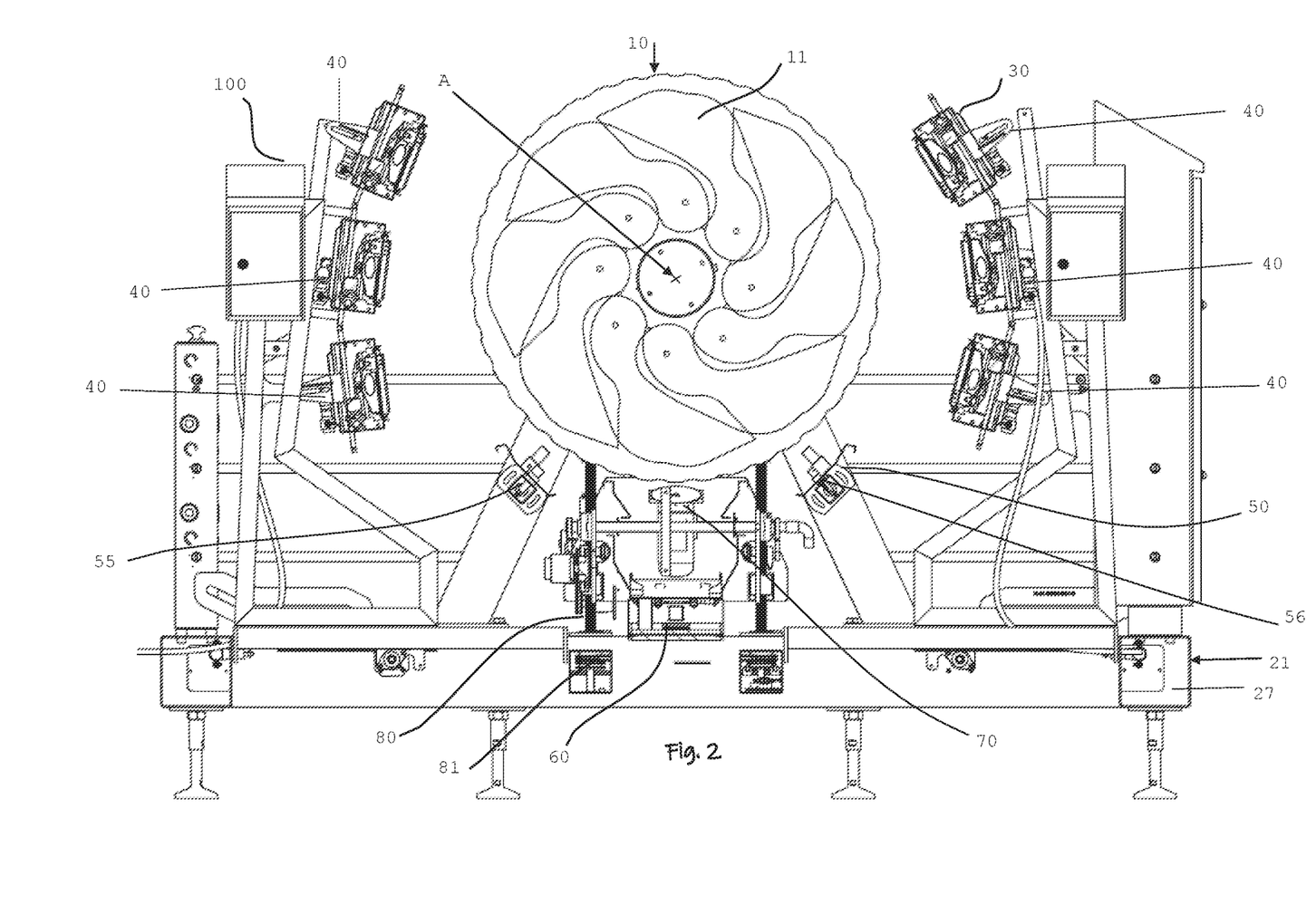
FIG. 2 is an illustration of a cross-sectional side view of a meat grill installation according to an embodiment of the present installation.

In the figures:
100 present installation
10 cylindrical element
11 adaptable diaphragm
12 fixator
13 uptake element
14 recess
15 cylindrical element gear
16 air and pressure relief holes
17 releasable confinement
18 releasable closure
20 motor
21 frame
22 meat
24 boundary
26 flap
27 support base
28 fence
30 heater
31 gas supply
40 position adapter
50 sensor
55 water supply
56 steam supply
60 conveyor belt
65 shuttle
66 tilt activator
67 tilt actuator
68 shuttle track
70 cutting element
80 adaptable support
81 connector
82 worm gear
83 gear FIG. 1 shows a layout of the present meat grill installation 100. The meat grill installation has a detachable horizontal cylindrical element 10. This cylindrical element is more particularly a cylindrical carrier for meat 22. The cylindrical element 10 is connected to a frame 21 of the installation 100 in such a manner that it can rotate around its main axis A. The element 10 may, in order to become reversibly disconnected from the installation as shown in FIG. 1, be lifted out of connection in an upward direction D with respect to the frame 21. FIG. 2 shows a cross-sectional view of the installation 100 according to FIG. 1.

Figure 3:
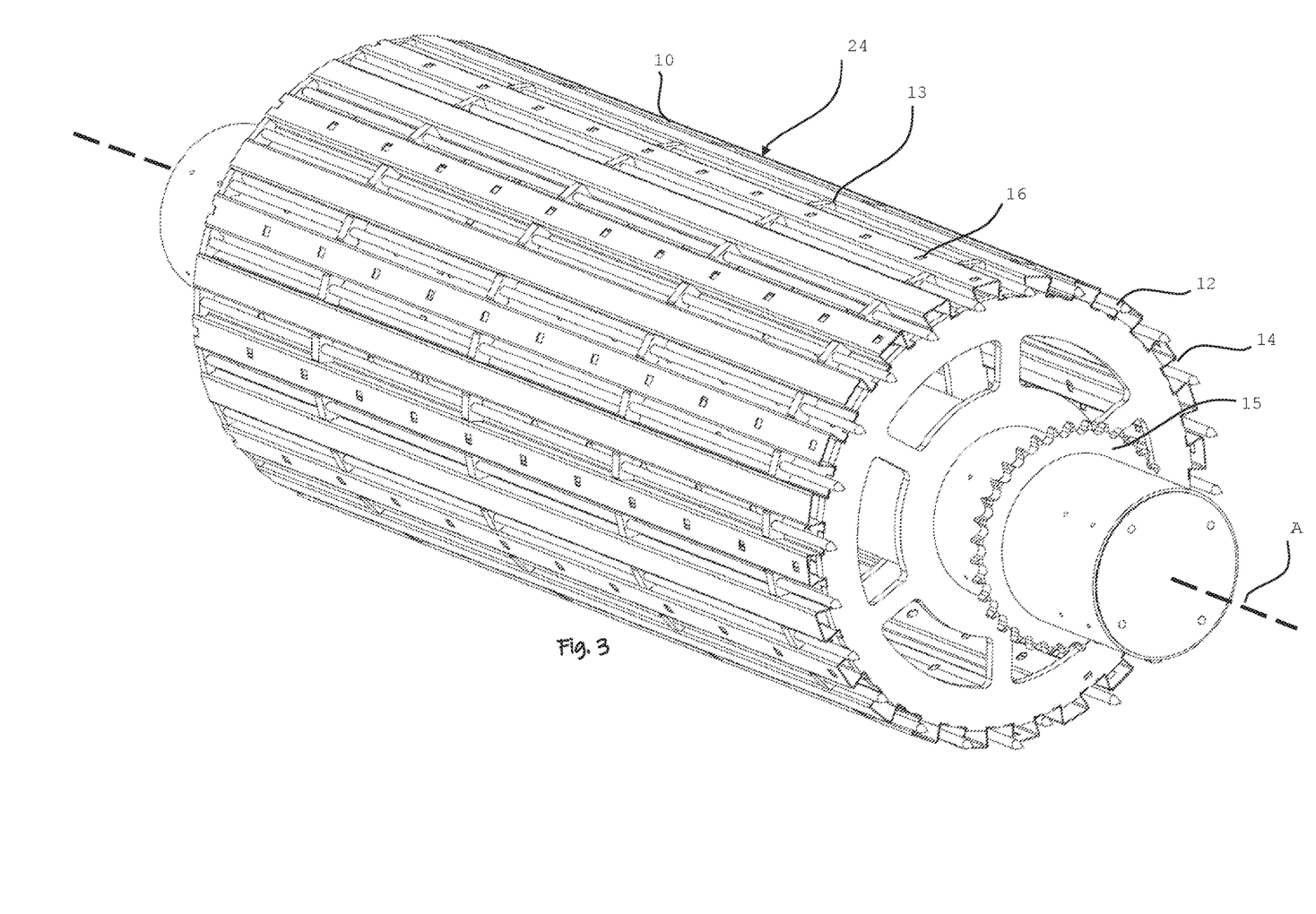
FIG. 3 is an illustration from a perspective view of the cylindrical element of a meat grill installation according to an embodiment of the present invention.

In FIG. 3 it is shown that the cylindrical element 10 comprises a series of meat fixators 12 at its boundary 24. That is to say that the cylindrical element 10 has, distributed along its circumference, a series of fixators 12, such as skewers or spikes onto which meat 22 can be removably fixed to the cylindrical element. Skewer and spike are here used as interchangeable terms. The skewers extend in the axial direction of the cylindrical element 10. The boundary 24 can be understood to mean the cylindrical surface of the cylindrical element 10 on which meat is carried, such as via the skewers. This cylindrical surface is provided with recesses 14 extending axially along the circumference such that fixators 12, such as the skewers, can be received therein. The cylindrical element 10 has in this example in each recess 14 a plurality of uptake elements 13. These uptake elements 13 are holders or clamps for removably fixing the fixators 12 within a respective recess. In FIG. 3 the uptake elements are holed partitions which extend in a radially outward direction from the base of a respective recess to an upper edge of said respective recess. The diameter of the hole (not shown, but customary) of such a partition is greater or equal to the diameter of the skewers.

Figure 7A:
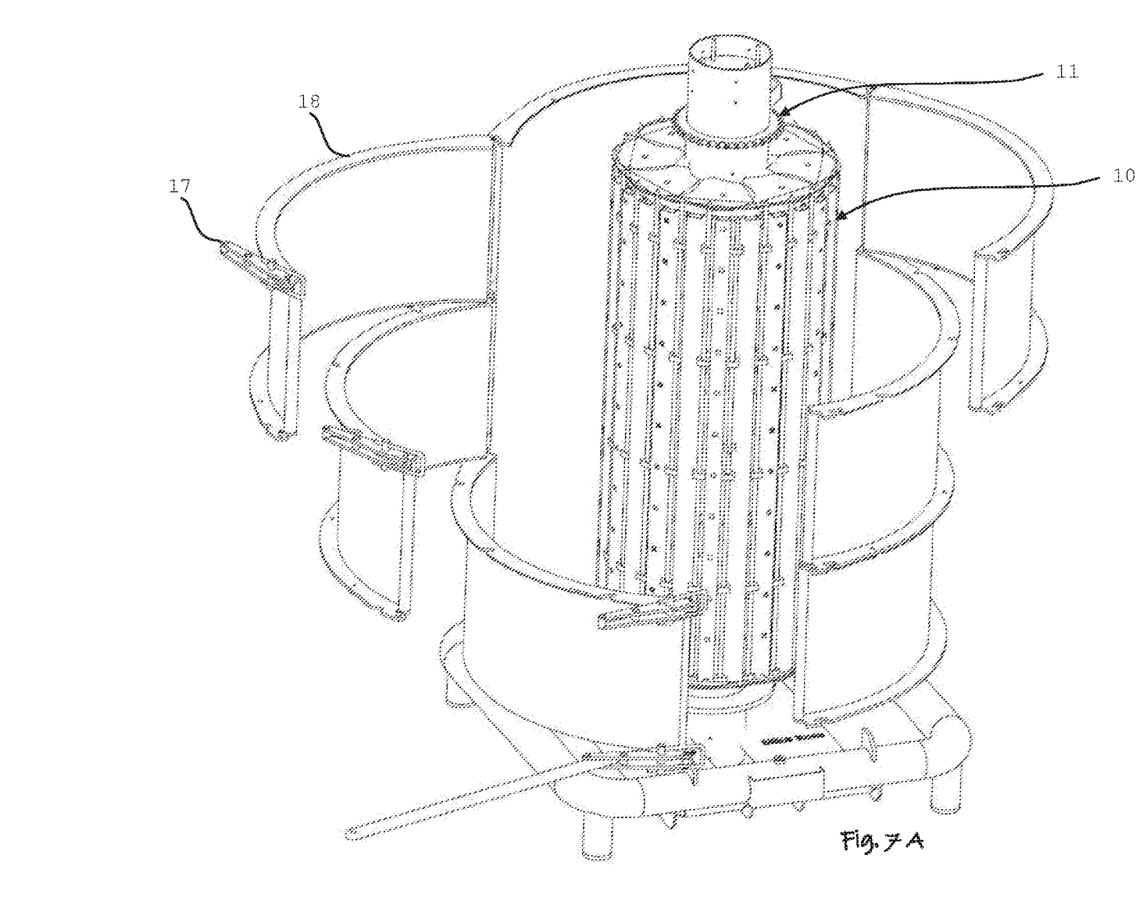
FIG. 7A is an illustration from a perspective view of the cylindrical element of the meat grill installation according to an embodiment of the present invention, the cylindrical element without meat.
Figure 7B:
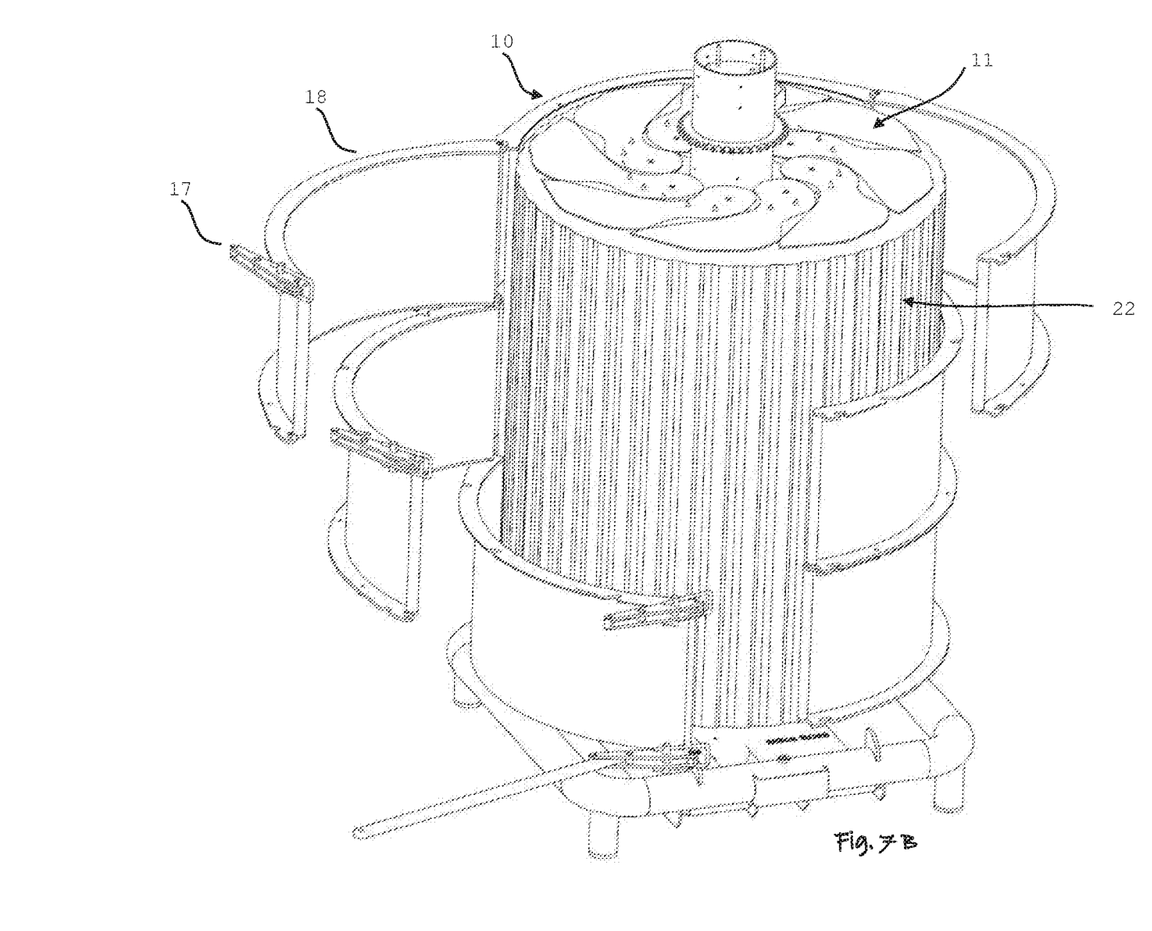
FIG. 7B is an illustration from a perspective view of the cylindrical element of the meat grill installation according to an embodiment of the present invention, the cylindrical element with meat.

Once the meat 22 is cast around the cylindrical element 10, as shown in FIG. 7b. The skewers are inserted such as to skewer the meat and fix it to the element 10. FIG. 7a shows the condition of the cylindrical element prior to the casting of meat onto the element 10. In FIG. 7a the skewers are shown for the purpose of showing their final position after insertion.

Figure 4:
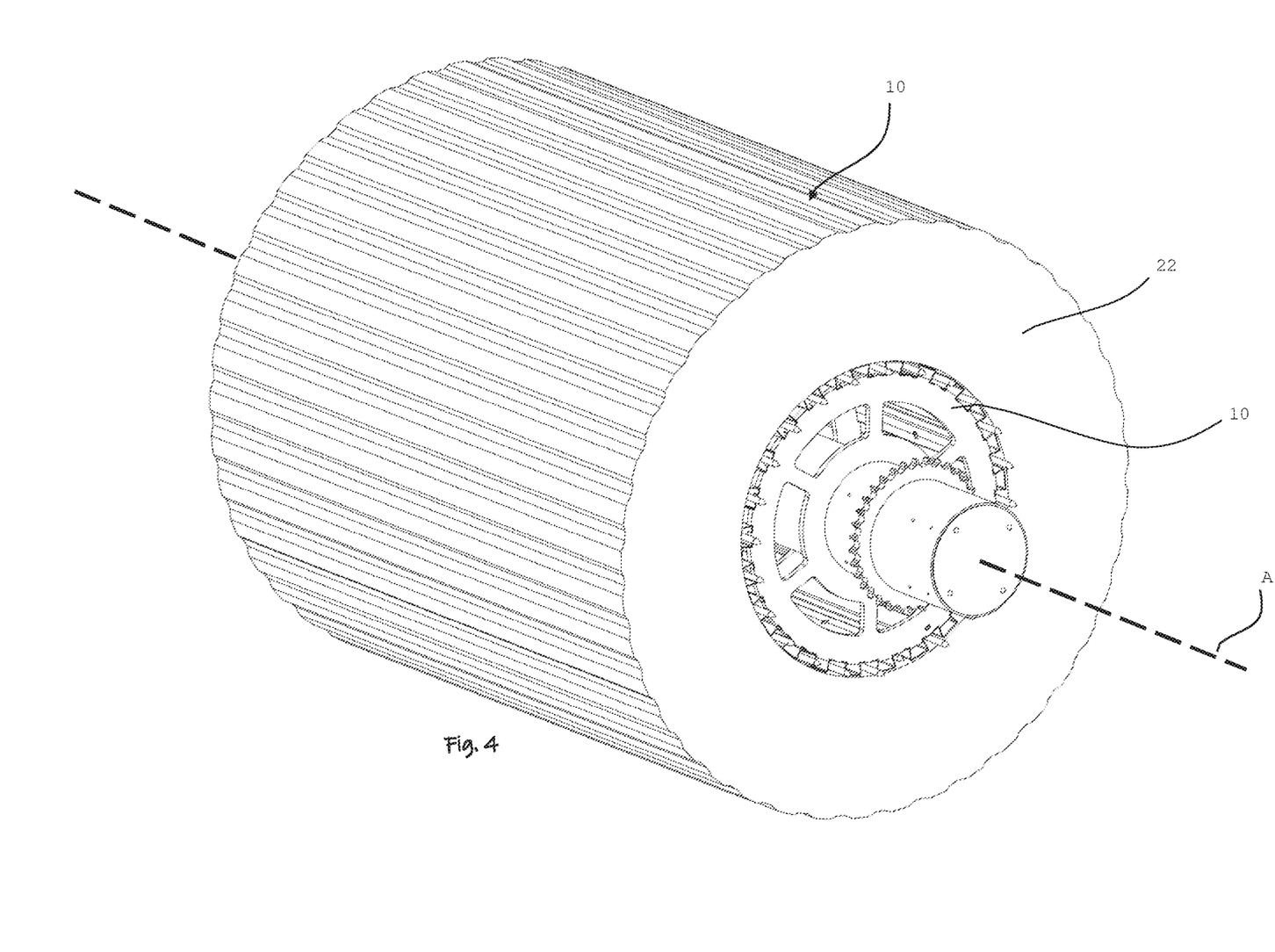
FIG. 4 is an illustration from a perspective view of the cylindrical element according to an embodiment of the present invention, the cylindrical element including meat.

FIG. 4 also shows condition of the cylindrical element 10 after the meat 22 has been fixed thereto.

Figure 5:
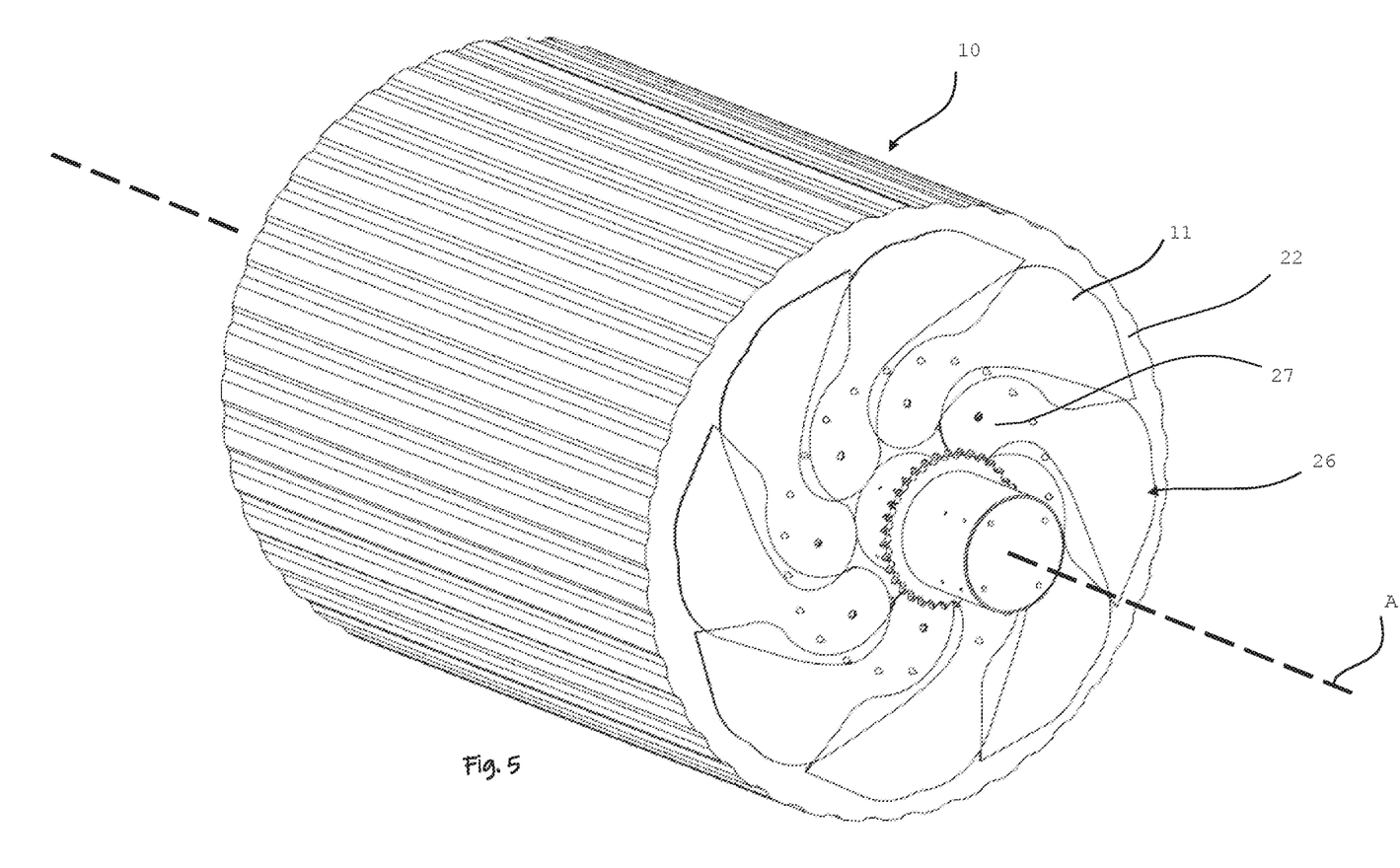
FIG. 5 is an illustration from a perspective view of the cylindrical element of a meat grill installation according to an embodiment of the present invention, the cylindrical element including meat and functioning of the diaphragm.

FIG. 5 shows that an adaptable diaphragm 11 is provided at each distal end of the cylindrical element. Each diaphragm comprises a plurality of partially overlapping flaps 26 which at least partially cover the meat at the distal ends of the cylindrical element 10. Each diaphragm is arranged to at least partly open and close by the overlapping of the flaps. The diaphragm 11 is at least partially open when the flaps assume a position in which the flaps extend radially outward with respect to the cylindrical element 10 such that there exists an opening between flaps. The diaphragm 11 is closed when the flaps are retracted radially inwards such that there is no opening between flaps. FIG. 5 shows a position wherein the diaphragm is closed. It is noted that each flap 26 of a particular diaphragm 11 is able to rotate around a connection point 27 by which it is fixed to the cylindrical element for radially extending or retracting thereby. The flaps 26 of each diaphragm 11 may be connected to move jointly in order to assume a partly open or closed position.

In FIG. 1 the installation 100 can further be seen to have a motor 20 for rotating the cylindrical element 10. This motor can be an electromotor. However, other motors-types are possible. The main axis is also referred to as the horizontal axis. However, it shall be understood that in practice this axis may be tilted with respect to a gravitational horizontal, such as between about 0-10 degrees. The installation can also be seen to comprise at least two, in this case six, heaters 30 for grilling the meat. The installation may optionally have a conveyor belt 60, which is in this example arranged directly underneath the cylindrical element 10. The conveyor belt 60 and is in this example used for receiving and transporting cooked meat that has been cut off from the cylindrical element 10 by a cutting element 70. The conveyor belt moves, in use, in a direction parallel to the longitudinal axis of the cylindrical element 10. The six heaters are optionally distributed in two groups as shown in FIG. 2. Each group is provided to heat opposite sides of the cylindrical element 10 such as to allow space between heating elements for the conveyor belt. The heaters are in this example gas heaters and as such a gas supply 31 for feeding gas to the heaters is provided to the installation. Alternatively, IR-radiation heaters may, such as electrical heaters, may be used.

The (gas) heaters 30 provide heat at an intensity of about 100-200 W/m$^2$, and operate at a temperature of about 700-1000° C. Should the heaters instead be electric they are merely arranged to emit infrared radiation at about 100-200 W/m$^2$ at a wavelength of about 1-5 μm and do not require to operate at any specific temperature. In one example the meat 22 is heated at a rate of about 1000 kg/4-12 h. The heaters heat the outer surface of the meat 22 as the meat is rotated with the cylindrical element 10. The heaters can be seen to be placed at equal distance from the main axis A. The heaters are rotated, that is to say tilted, such that the direction of heating of each heater is directed towards and is substantially perpendicular to the axis A. An Additional motor (not shown, but customary) may also be comprised in the installation for tilting the heaters. In this example the heaters 30 are arranged for being manually tilted. A length of each heater 30 is individually adapted to a length of the cylindrical element, typically being more or less (±5%) the same length. That is to say that the total length of the heater is equal to about 0.95-1.05 times the length of the cylindrical element 10. For each heater 30 the installation 100 comprises a position adapter 40. Each heater is connected to the frame 21 of the installation 100 via such an adapter 40. The distance of each heater 30 to the cylindrical element 10 may be adjusted manually. The adapter 40 is in this example, but entirely optionally arranged for slidably connecting the heater 30 to the frame 21 and for maintaining the heater at a predetermined distance from the cylindrical element, that is to say to the meat on the cylindrical element 10. When, in use, meat is cut away the radius of the total radius of the cylindrical element with meat becomes smaller and smaller, causing the heaters to be further and further away from the outer surface of the meat 22. Therefore, position adapters are provided to maintain the heaters at a substantially similar distance from the meat over time. These adapters 40 may be motorized such as to allow the heaters to be slid towards the cylindrical element 10. This change in distance will result in a change in overall change in surface temperature of the meat, which is detectable. To this end at least one sensor 50 is provided, preferably at least two sensors, for determining a temperature of the heated meat. This at least one sensor 50 is in this example an infrared temperature sensor. The sensed temperature is in this example used to increase or decrease the distance of the heaters with respect to the meat. The distance of the heaters is adjusted such that the temperature remains equal throughout the cooking process. Optionally or alternatively, the at least one sensor 50 is used to increase or decrease the temperature of the heaters themselves, to increase or decrease a rotation velocity of the cylindrical element, or maintain these variables, or a combination thereof.

The conveyer belt 60 is provided located underneath the cylindrical element for receiving and transporting heated meat that is cut off from. The conveyor belt typically moves in operation in a direction parallel to the longitudinal axis of the cylindrical element. For cutting meat a cutting element 70, in this example a knife, is provided for removing a slice of a predetermined thickness of meat from the detachable cylindrical element, which typically moves in operation in the same or opposite direction as the conveyor belt.

Figure 6:
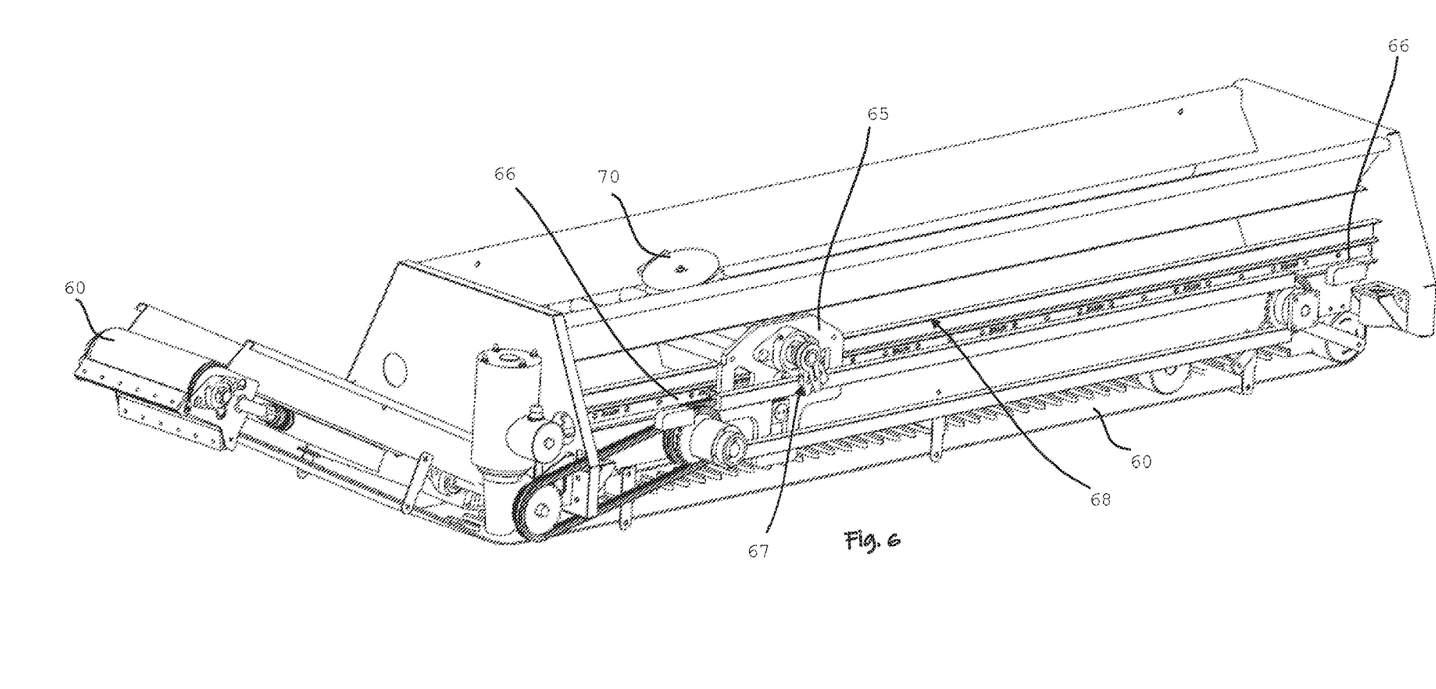
FIG. 6 is an illustration from a side view of the conveyor belt, shuttle and cutting element of a meat grill installation according to an embodiment of the present invention.

FIG. 6 shows the cutting element 60 to be a rotating disc provided with a sharp edge. The cutting element 60 is provided on a shuttle 65. Said shuttle is arranged for moving within a shuttle track 68. The shuttle 65 is adapted for forward movement and backward movement along a shuttle track 68. The shuttle track extends in a direction parallel to the axis A. A tilt of the cutting element can be adjusted via a tilt actuator 67, such as a tilt handle, comprised in the shuttle 65. A tilt activator 66, such as a notch, is provided along the shuttle track 68. In this example the tilt actuator 67 is actuated by the activator 66 when, is use, the shuttle reaches the activator 66 as it is moved along the track. The activator 66 is arranged such that the shuttle tilts and fixes the cutting element in a forward angle of about 5-35 degrees with respect to the horizontal plane, and wherein during backward movement the shuttle tilts and fixes the cutting element in a backward angle of about minus 5-35 degrees with respect to the horizontal plane. In this example, the shuttle track 68 and conveyor 60 are jointly supported on at least three adaptable supports 80. These supports 80 can be raised or lowered such as to jointly move the cutting element 60 in a direction towards or away from the cylindrical element respectively. The supports 80 are mutually connected by a connector 81, in this example a chain. By moving the cutting element in the above described manner the thickness of meat slices can be adjusted and maintained. The supports 80 further comprise a worm gear 82, and a gear 83 adapted to be driven by the connector. The manner in which the shuttle moves along the track is also motorized. The shuttle may be operated such as to move across the full or a partial length of the track 68 and at adjustable speed. This determines the length of slices.

At least one controller, such as a computer (not shown, but customary), is provided for driving the motor, for maintaining and/or adapting a temperature of each individual heater, for driving the at least two position adapters, for receiving the sensor output, for providing feedback to at least one heater, and for controlling the length of slices of meat, for controlling the thickness of slices of meat, and combinations thereof.

The at least one controller is optionally arranged for controlling all motorized operations described herein above, including regulating heater temperature by regulating for example the gas flow to the heaters. Further optionally the controller is provided with a human interface (not shown, but customary), to allow an operator to control at least some of the motorized operations and/or heater temperature via said human interface. For operation the human interface may comprise start and stop buttons (not shown, but customary) as well as buttons for regulating the above-mentioned motorized operations and gas flow. In addition, software may be provided for controlling the installation, typically loaded on a storage medium and provided as a processor or to a processor. The storage medium may be part of the processor memory of the processor or a non-transitory computer readable medium, such as a hard drive or solid-state drive. Therewith large quantities of meat can be processed in a well-controlled manner in a relatively short time.

In this example the cooking and cutting process can be controlled by the controller such that slices of meat have a length of about 1-150 cm, a thickness of about 1-5 mm, and a width of about 10-100 mm. The meat is heated to a temperature of about 100-170° C. In use, the cylindrical element 10 rotates with a speed of about 1-10 degrees/sec and the conveyor belt runs with a speed of about 0.5-2 m/sec.

It shall be understood that a variety of different meats or compositions of meats may be cooked using the described installation 100. As a matter of example the meat 22 is selected from chicken, pork, lamb, beef, fish, plant protein, microbial protein, cell protein, insect protein, in vitro meat, or a combinations thereof.

In FIG. 2 a water supply 55 is present for adjusting the water content of the meat. This prevents the meat from drying out during the cooking process. A steam supply 56 is also present for adjusting the temperature of the meat as it is cooked. Optionally, the water and/or steam supply is controlled by means of the controller.

In the example of FIG. 1 the frame comprises a support base 27 for keeping the installation elevated off of the floor. Further security measures may also be present, such as a fencing 28. FIGS. 7A and 7B show the present cylindrical element without and with meat. Further a releasable confinement 17 and a closure 18 is also shown in these figures, in a partly opened situation.

The figures have also been detailed throughout the description. The terms cutter and cutting element will be understood to be interchangeable. The terms cylindrical element and cylindrical carrier will also be understood to be interchangeable.

The preceding examples can be repeated with similar success by substituting the generically or specifically described components and/or operating conditions of embodiments of the present invention for those used in the preceding examples.

The terms "about" or "approximately" as used herein, mean an acceptable error for an articular recited value, which depends in part on how the value is measured or determined. In certain embodiments, "about" can mean one or more standard deviations. When the antecedent term "about" is applied to a recited range or value it denotes an approximation within the deviation in the range or value known or expected in the art from the measurement method. For removal of doubt, it should be understood that any range stated in this written description that does not specifically recite the term "about" before the range or before any value within the stated range inherently includes such term to encompass the approximation within the deviation noted above.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A meat grill installation comprising:
   a detachable horizontal cylindrical carrier for carrying meat, the cylindrical carrier comprising a series of meat fixators;
   a motor for rotating the cylindrical carrier around its horizontal axis;
   at least two heaters for grilling the meat, the at least two heaters divided over a circumference of the cylindrical carrier, and wherein a length of each heater is individually adapted to a length of the cylindrical carrier;
   at least two position adapters for maintaining each individual heater at a predetermined distance from the cylindrical carrier;
   at least one sensor for determining a temperature of the heated meat;
   a conveyer belt located underneath the cylindrical carrier for receiving and transporting heated meat;
   a cutter for removing a slice of a predetermined thickness of meat from the detachable cylindrical carrier; and
   at least one controller for driving the motor, for maintaining and/or adapting a temperature of each individual heater, for driving the at least two position adapters, for receiving the sensor output, for providing feedback to at least one heater, and for controlling thickness of slices of meat.

2. The meat grill installation according to claim 1, further comprising at least three in height adaptable supports, wherein the height of the supports is controlled by the at least one controller, and wherein the conveyor belt, at least one sensor, and cutter are attached to the at least three supports.

3. The meat grill installation according to claim 1, further comprising at least one water supply for adapting a water content of the meat, and/or comprising at least one steam supply.

4. The meat grill installation according to claim 1, wherein the cylindrical carrier comprises two diaphragms, one at either side thereof, for enclosing meat, which diaphragms are adapted to:
   at least partly open; and
   close.

5. The meat grill installation according to claim 2, wherein the at least three supports are mutually connected by a connector, and wherein the at least one controller drives the connector and thereby the height of the supports.

6. The meat grill installation according to claim 2, wherein the at least three supports comprise a worm gear, and a gear adapted to be driven by the connector.

7. The meat grill installation according to claim 1, wherein the horizontal speed of the cutter and conveyor belt are adapted to one and another.

8. The meat grill installation according to claim 1, wherein the cutter is adapted to be driven back and forth.

9. The meat grill installation according to claim 1, further comprising a shuttle in connection with the cutter, wherein the shuttle is adapted for forward movement and backward movement, wherein during forward movement the shuttle tilts and fixes the cutter in a forward angle of about 5-35 degrees with respect to the horizontal plane, and wherein during backward movement the shuttle tilts and fixes the cutter in a backward angle of about minus 5-35 degrees with respect to the horizontal plane.

10. The meat grill installation according to claim 1, wherein the series of meat fixators comprise 2-30 spikes and/or
wherein the cylindrical carrier comprises at least two uptake elements per meat fixator, such as 3-6 uptake elements and/or
wherein the cylindrical carrier comprising at least four recesses provided along a longitudinal axis of the cylindrical element.

11. A method of heating about 100-3000 kg of frozen meat, the method comprising:
   providing a cylindrical carrier with meat, the cylindrical carrier comprising at least one diaphragm, wherein the at least one diaphragm is opened;
   moving the cylindrical carrier into the meat grill installation of claim 1;
   heating the meat; and
   cutting at least one slice of meat.

12. The method according to claim 11, wherein the slice of meat has a length of about 1-150 cm, a thickness of about 1-5 mm, and a width of about 10-100 mm.

13. The method according to claim 11, wherein the meat is heated to a temperature of about 100-170° C.

14. The method according to claim 11, wherein the heating provides infrared radiation at a wavelength of about 1-5 μm, and/or at an intensity of about 100-200 W/m², and/or operate at a temperature of about 700-1000° C.

15. The method according to claim 11, wherein the meat is cooked, grilled, or a combination thereof.

* * * * *